(12) United States Patent
Hung et al.

(10) Patent No.: US 6,749,120 B2
(45) Date of Patent: Jun. 15, 2004

(54) METHOD AND APPARATUS FOR SCANNING ELECTRONIC BARCODES

(75) Inventors: Patrick Siu-ying Hung, Saratoga, CA (US); James C. Dunphy, San Jose, CA (US)

(73) Assignee: CPO Technologies Corp., Sunnyvale, CA (US)

( * ) Notice: Subject to any disclaimer, the term of this patent is extended or adjusted under 35 U.S.C. 154(b) by 68 days.

(21) Appl. No.: 09/736,731

(22) Filed: Dec. 11, 2000

(65) Prior Publication Data

US 2002/0070278 A1 Jun. 13, 2002

(51) Int. Cl.[7] .................................................. G06K 7/10
(52) U.S. Cl. .................................................. 235/472.01
(58) Field of Search ....................... 235/472.01, 462.25, 235/462.42, 462.45, 462.46, 462, 472, 469, 494, 491; 356/73, 343; 348/272, 304, 308

(56) References Cited

U.S. PATENT DOCUMENTS

| | | | | |
|---|---|---|---|---|
| 4,488,679 A | * | 12/1984 | Bockholt et al. ............ 235/469 |
| 5,317,331 A | * | 5/1994 | Patty et al. ..................... 345/16 |
| 5,367,596 A | * | 11/1994 | Chow .......................... 385/116 |
| 5,399,852 A | * | 3/1995 | Zheng et al. ................. 250/225 |
| 5,408,084 A | * | 4/1995 | Brandorff et al. ......... 250/208.1 |
| 5,517,018 A | * | 5/1996 | Zheng et al. ............. 250/208.1 |
| 5,519,513 A | * | 5/1996 | Copenhaver et al. ........ 358/475 |
| 5,567,934 A | * | 10/1996 | Zheng et al. ............. 250/237 R |
| 5,616,908 A | * | 4/1997 | Wilz et al. ............... 235/462.08 |
| 5,702,059 A | * | 12/1997 | Chu et al. ............... 235/472.01 |
| 5,920,061 A | * | 7/1999 | Feng ....................... 235/472.01 |
| 5,939,697 A | * | 8/1999 | Spitz ....................... 235/462.15 |
| 5,984,186 A | * | 11/1999 | Tafoya .................... 235/462.01 |
| 6,062,475 A | * | 5/2000 | Feng ....................... 235/462.21 |
| 6,065,678 A | * | 5/2000 | Li et al. .................. 235/462.46 |
| 6,177,683 B1 | * | 1/2001 | Kolesar et al. ............. 250/566 |
| 6,347,163 B2 | * | 2/2002 | Roustaei ..................... 382/324 |
| 6,385,352 B1 | * | 5/2002 | Roustaei ..................... 382/324 |

* cited by examiner

*Primary Examiner*—Thien M. Le
*Assistant Examiner*—Edwyn Labaze (57) ABSTRACT

A scanner is provided that can read two-dimensional barcodes from reflective or emissive electronic displays. Illumination, exposure, and contrast can be automatically adjusted according to the type of display and variations in brightness or reflectivity. The scanner includes an imaging camera with high spectral response for reading from color displays. The scanner can also adapt to read barcodes from displays with non-square pixels.

32 Claims, 6 Drawing Sheets

METHOD AND APPARATUS FOR SCANNING ELECTRONIC BARCODES

CROSS REFERENCE TO RELATED APPLICATIONS

Not Applicable.

STATEMENT AS TO THE RIGHTS TO INVENTION MADE UNDER FEDERALLY SPONSORED RESEARCH AND DEVELOPMENT

Not Applicable.

FIELD OF THE INVENTION

This invention relates to computer-readable codes such as barcodes, and more particularly to methods and apparatus for scanning codes from an electronic display or screen.

BACKGROUND

Barcodes provide a quick and convenient method of reliably entering information into a computer or computer system by scanning the barcode. They have become very common on a wide variety of consumer goods and services. An example of when a barcode is used with a service is when a barcode is printed on a membership card. Some barcodes are printed on packaging, such as barcodes indicating the universal product code ("UPC") of an item, and others are unique, such as a barcode printed on a parking garage ticket that indicates the date and time of when the ticket was taken. The data in the barcode is generally represented as a pattern of two levels of surface reflectivity, such as black and white stripes for a one-dimensional barcode. Two-dimensional barcodes also use a pattern of alternating reflectivities, but in a pattern of squares or other shapes. In either event, the data contained in the barcode is coded according to a binary coding system and the light and dark areas are interpreted as 1's and 0's or vice versa.

Barcodes are typically scanned by a scanner or reader (hereinafter "reader"). One type of reader has a lamp that uniformly illuminates the barcode, and an imaging sensor, such as a charge-coupled device ("CCD") array, CMOS detector, or other electronic imaging method, that detects the scattered light that is reflected off the barcode. Dark ink on light paper is a typical medium for presenting barcodes. The dark ink or paint provides low-reflectivity regions, and the light colored or matte (light scattering) paper provides high-reflectivity regions. Of course, one may use light paint on a dark background.

Another type of reader builds a map of surface reflectivity by rastering a laser beam over the surface. A single photodiode detects the light reflected from each position of the laser spot on the surface. This type of barcode reader is called a laser barcode scanner.

Unfortunately, neither approach is currently well-adapted to reading barcode images displayed on information display screens, such as the display screen of a wireless telephone ("cell phone") or personal digital assistant ("PDA"). Rendering a barcode on a display of a cell phone or PDA would be desirable because it would relieve the consumer from needing to carry the bits of paper usually associated with tickets and coupons, for example.

Display screens can be divided into two classes, reflective and emissive. Reflective screens are broadly defined as screens that alter their reflectivity of ambient light to form an image, typically from light and dark pixels, such as passive black and white liquid crystal displays ("LCDs"). Emissive screens, such as backlit LCDs and cathode ray tubes ("CRTs") internally generate the light emitted from their surface. Conventional laser barcode scanners do not work well with emissive display screens because the emissive displays do not necessarily change their surface reflectivity with image content. Imaging scanners may be able to read both types of screens, but might have difficulty with reflections off the surface of the display and insufficient contrast between the light and dark portions of the scannable code.

One reason reflective display screens do not work well with conventional barcode readers is that the reflective display screens are typically designed with the assumption that little light will be incident from the direction of the viewer. In normal use the viewer's head will block light from this direction. Therefore, screens are often built without antireflection coatings on the front surface or at internal optical interfaces.

However, the light source built into laser barcode scanners typically projects bright light from the direction of the camera or photodiode(s). This causes reflections in the image observed by the camera that can interfere with the displayed image. In addition, the overall light levels of barcodes displayed on reflective screens are different than for normal barcodes. For example, LCDs have internal polarizers that reflect a much smaller fraction of incident light than a painted or white paper surface. To the scanner, both light and dark pixels may appear dark.

Emissive screens may be easier for barcode scanners to read; however, they too may have compatibility problems. Emissive screens often have a diffusing front coating or surface treatment of the glass to reduce specular reflection of ambient light. Illuminating emissive screens with the lamps on a barcode scanner adds a scattered light background component to the light emitted from the screen. This background of scattered light reduces the contrast between light and dark pixels. Additionally, specular reflections of the light from the barcode scanner lamp to the camera or photodiode(s) can interfere with scanning as with reflective display screens.

If a barcode reader can't scan the barcode the first time, it typically tries again and again. Often, the scanning fails and the clerk must take additional time to enter the data that would have otherwise been scanned into the computer.

Therefore, a barcode reader that can quickly and reliably scan codes rendered on an electronic display screen is desirable. It is further desirable that the barcode scanner be able to read codes from emissive or reflective screens.

SUMMARY

A barcode reader uses an imaging technique to quickly and accurately scan barcodes rendered on electronic displays. A shade on the barcode reader blocks ambient light from the CCD imager ("camera") and configures the barcode reader illumination to be off-normal from the surface of the display. A variety of CCD cameras are available from a variety of vendors, such as cameras sold under the trade name MEGAFILL™ by KODAK. The light detector array is typically integrated with on-chip electronics for interfacing the camera to an instrument. In one embodiment, a CCD array with a 640 by 480 pixel detector array was used with a fill factor greater than 80%; however, it is possible to use cameras with lower fill factors and fewer elements to read two-dimensional barcodes, especially if software filtering methods are used to enhance the image. The barcode reader can detect light emitted from the display to turn off scanner illumination, thus avoiding interference between the emitted light and the scanner light and specular reflections of the scanner light into the camera.

In a further embodiment, the exposure time of the CCD camera is set to between 2–20 times the vertical refresh period of a display. In a yet further embodiment, the refresh rate of the display is detected by the barcode reader and the exposure time of the CCD camera is adjusted accordingly to between 2–20 times the measured refresh rate. This enhances accuracy of the scan by reducing errors caused by the display flicker.

The CCD imager uses automatic exposure or gain to optimize image contrast. In a particular embodiment, decoder software is used to set the detection threshold of the CCD camera. In an alternative or further embodiment, the scanner illumination is adjusted to achieve the desired contrast. In another embodiment, a CCD array with a wide spectral response is used to reduce or avoid Moiré patterns from color pixels.

In another embodiment, the barcode scanner adjusts scaling in response to displays with non-square pixels. In a particular embodiment an initial scan determines if a two-dimensional barcode is rendered as the standard pattern of squares, or as a pattern of rectangles arising from rectangular display pixels. The scanner alters the horizontal-vertical scaling to interpret the displayed rectangles as appropriate barcode elements.

DETAILED DESCRIPTION OF PREFERRED EMBODIMENTS

1. Introduction

The present invention provides a scanner for scanning computer-readable codes from an electronic display, such as two-dimensional barcodes. Scanners according to the present invention can incorporate both physical features, such as alignment shrouds, illumination lamps, a high fill factor CCD camera with multiple pixel blocks for each barcode element, and a CCD camera with a wide spectral response for use with color displays. Scanning systems according to the present invention can also include a number of operating features, such as dynamically adjusting the exposure time to overcome display flicker or variations in brightness or reflectivity of the display screens, automatically re-scaling the scanning system to adapt to displays with non-square pixels, and identifying display type and configuring the scanner accordingly.

2. An Exemplary Scanner

Figure 1A:
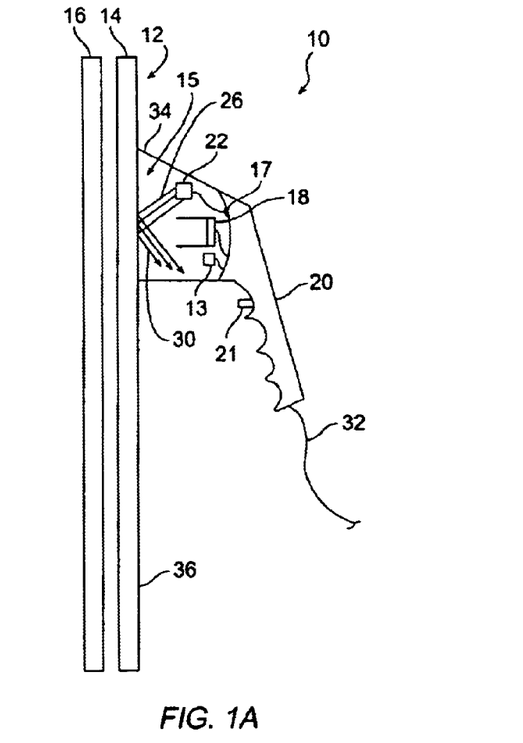
FIG. 1A is a simplified cross section of a barcode reader according to an embodiment of the present invention applied to a display screen.

FIG. 1A is a simplified cross section of a barcode reader ("scanner") 10 according to an embodiment of the present invention. The scanner is held against a display screen 12 that is illustrated as being flat, but could be curved. The display includes layers of glass or plastic 14, 16, which may be coated. For example, if the display is an LCD display, one of the layers would have a polarization coating. The scanner is sectioned along section line 17 to facilitate illustration of the interior 15 of the scanner.

A CCD camera 18 is mounted in the scanner, which in this case includes a handle 20 with a trigger 21 that activates the scanner when depressed. A separate (from the imager) photodiode 13 is included to measure the emissivity of the screen, and the refresh rate in some embodiments. An illumination lamp 22 is mounted such that light emitted by the lamp is not directly reflected off of the layers of the display back into the CCD camera. In a particular embodiment, the lamp is placed so that the light from the lamp, represented by the arrows 26 is reflected off the outer layer 14 of the display at an oblique angle to avoid direct reflection into the CCD camera, as represented by the arrows 30. Generally, the lamp is placed on the center of the lateral axis above the CCD camera, but could be placed in a sideways oblique orientation. A cable 32 connects the scanner to a power supply and camera control and imaging electronics. A flat display is shown for simplicity of illustration. If a display is curved, it is typically only slightly curved, and not sufficiently to alter operation of the scanner.

Some conventional scanners have a built-in laser that generates a crosshair pattern over the imaged region to assist the user in aiming the scanner at the barcode. The image is intended to reflect off of a matte surface and does not show up well when projected onto some types of display screens, which can be both transparent and smooth. For reading displays, a mechanical alignment system, such as a wire frame attached to the scanner, should be used instead of the optical alignment marker. Alternatively, the CCD camera can be used to show the imaged region on a second computer display screen viewed by the sales clerk, so that the clerk sees what the scanner is imaging and adjust the position of the scanner accordingly.

Scanners according to one embodiment of the present invention use an alignment shroud 34 that serves at least two functions. First, the sides of the shroud block ambient light (such as room lights) from entering the scanner and causing an error in reading the light level or causing bright specular reflections off the screen in the camera field of view. Second, the shroud aligns the CCD camera 18 and illumination lamp 22 relative to the surface 36 of the display screen 12 so that the bright light from the illumination lamp is not directly reflected into the CCD camera. Thus, the illumination lamp illuminates the display screen within the aperture of the CCD camera, but does not directly reflect into the camera. Otherwise, the result would be similar to pointing a video camera at a bright light. The specularly reflected light would saturate a portion of the camera field of view, preventing imaging of the barcode. The light from the illumination lamp should be incident to the surface of the display at an angle greater than the maximum angle measured from the edge of the imaged area nearest the illumination lamp. For example, if the camera viewing angle is between 10–13 degrees from normal to the screen, the light source should be more than 13 degrees from normal to any point on the screen.

The CCD camera is preferably a high fill factor CCD array with a fill factor of at least 80%. It is further preferable that the CCD camera has a wide spectral response, generally from about 400 nm to 700 nm in order to avoid Moiré patterns that might otherwise form when scanning a color display screen that is generally designed to be viewed by a person. Moiré patterns and similar optical artifacts can combine with the intended barcode pattern to cause scanning errors, and even a complete inability to recognize the barcode.

It is particularly desirable that the sensitivity in the range of 400–700 nm not fall below 10% of the peak sensitivity within this range. Ideally, the detector would image the red, green, and blue pixels of a white display screen with equal sensitivity. This reduces the brightness variation across the complete pixel as measured by the camera. (The actual sensitivity to the 3 subpixel colors may vary slightly due to variations in subpixel spectra among different display types.) In a particular embodiment, a color filter between the detector array and the display screen compensates for wavelength-dependent sensitivity of the detector. Specifically, the filter preferentially absorbs the middle (green portion) of the range compared to the ends (red and blue) since a photopic camera is more sensitive to the light emitted by the green subpixels of a typical display. It was found that near infra-red detectors used on conventional linear scanners did not work well because the display screen absorbed most of the light at the operating wavelength of the scanner.

It is generally desirable that two-dimensional barcodes rendered to the electronic display use only square-format elements, such as two-dimensional barcodes according to the DATAMATRIX™ format or according to the AZTEC™ format. Other barcode formats, such as PDF417™, which is a stacked linear (non-square) format, can also be used. For example, a two-dimensional barcode according to the Aztec™ format can be 15 by 15 up to 151 by 151 display elements (squares).

When rendering a two-dimensional barcode to a display, it is generally desirable to display each barcode element as an N×M block of pixels to reduce the effect of Moiré patterns, particularly on display screens with low fill factors. N and M are integers, and typically N=M; however, in some instance, such as with non-square display screen pixels, N might not equal M. Examples of portable electronic devices with displays having non-square pixels include portable high-definition television ("HDTV") and digital video disk ("DVD") players. Each element of the barcode is represented by one pixel, or by 2×2, 3×3 or similar groups of pixels. Barcode standards typically require that all elements of the barcode be of equivalent size so arbitrary non-integer scaling of the barcode onto the display screen is not possible. However, the present invention overcomes this limitation by scaling the high-resolution image obtained by the CCD camera using post-imaging software.

By making the barcode elements larger than one pixel, the feature of the pixels are made smaller relative to the barcode elements. This does not actually suppress interference, but makes the effects of interference easier to remove using filtering software, or to separate the imaged interference from the barcode features. For example, a "Gaussian blurr" or a two-dimensional Fourier Transform filter may be used to remove high spatial frequencies, such as would lie above the image artifacts associated with the pixels, while retaining the details of the barcode symbol. The filtering techniques may be adaptive, adjusting the filtering parameters to the interference pattern present in the image data.

Figure 1B:
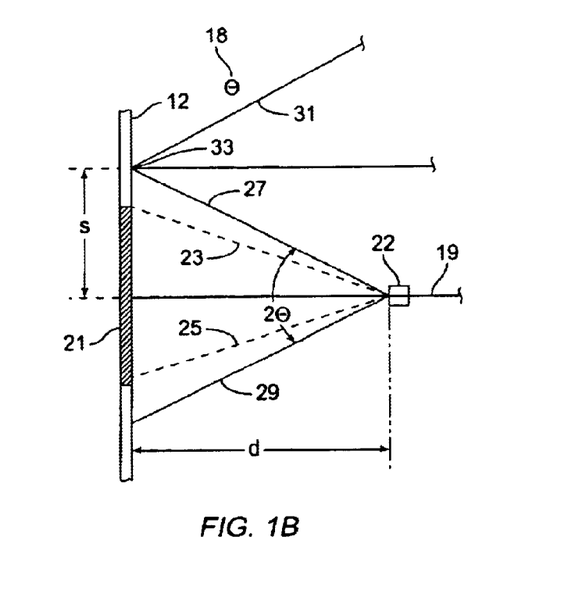
FIG. 1B is a simplified diagram illustrating the relationship between the illumination source, camera, and display screen.

FIG. 1B is a simplified diagram illustrating the relationship between the illumination source 18, camera 22, and display screen 12. For simplicity of illustration, it is assumed that the camera lens is relatively small so that it can be represented as a point, and that the screen is flat and perpendicular to the center axis 19 of the camera. Those skilled in the art will appreciate that this illustrative example can be adapted to screens that are slightly curved and to cameras with typical lens diameters, and to situations where the center axis of the camera is not precisely perpendicular to the screen.

A barcode image 21 displayed on the screen is represented in side view as a solid dark region. The camera has a viewing angle (2θ) that is sufficient to image the entire barcode image. Ideally the viewing angle is slightly larger than the barcode image to facilitate alignment of the camera, as shown by the solid lines 27, 29. At a minimum it is the same as the size of the barcode as shown by the dashed lines 23, 25. Theta is typically between 10–13 degrees for a distance d between the screen 12 and the camera lens of about 15–20 cm and a width (2s) of the imaged region being about 14 cm. The general case is that the illumination source should be above a limit line 31 starting at the edge of the imaged region 33 and extending away from the screen at an angle from normal of inverse tangent (s/2d). This configuration avoids specular reflections into the camera.

3. An Exemplary Scanning System

Figure 1C:
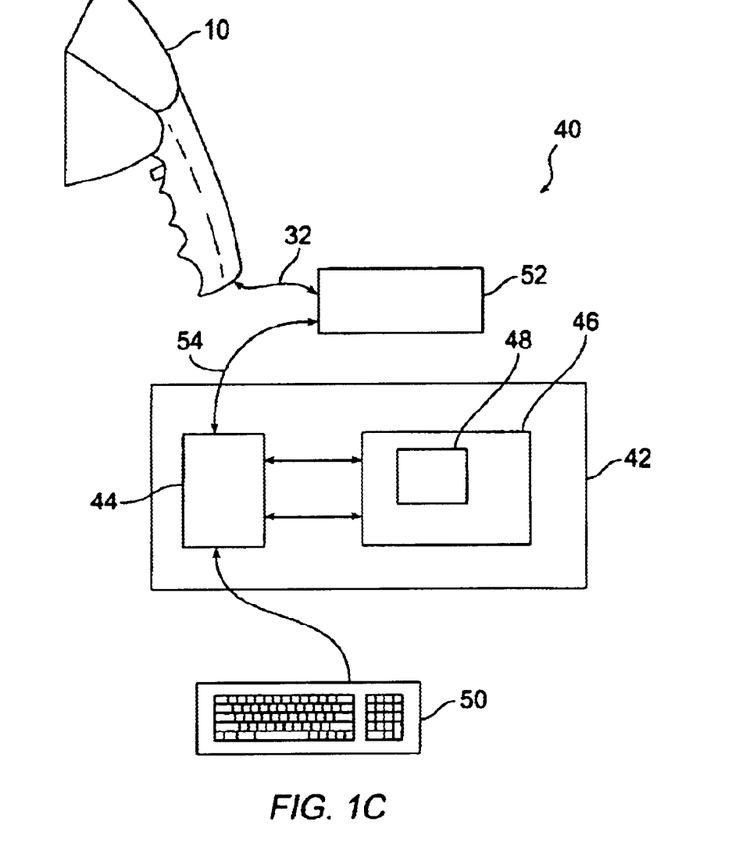
FIG. 1C is a simplified diagram of a barcode scanning system according to an embodiment of the present invention.

FIG. 1C is a simplified diagram of a barcode scanning system 40 according to an embodiment of the present invention. A scanner 10, such as is described above in reference to FIG. 1A, is coupled to a computer 42 or computer network. The computer includes a processor 44 and memory 46, such as random-access memory ("RAM"), read-only memory ("ROM"), compact-disk ROM, magnetic hard drive, magnetic floppy drive, and other types of memory and combinations thereof as are generally known in the art. A computer-readable program 48 stored in the computer memory 46 configures the system to execute various tasks under the control of the processor 44. Additional input to the computer may optionally be provided with a user input device 50, such as a keypad or mouse used in conjunction with a screen, as is well known in the art.

The scanning system is adapted in a number of fashions to scan barcodes from display screens. In one embodiment of the present invention, the CCD camera in the scanner 10 detects whether any light is being emitted by the display, i.e. whether the display is an emissive display. This is done by starting with the illumination lamp off. If no emitted light is detected, then the system presumes that the display is a reflective display and the lamp is turned on.

In another embodiment the system dynamically compensates for brightness variations across the display screen. For example, emissive screens often exhibit a brightness variation of up to 30% across the screen. This variation does not affect viewing by a typical user, as the human eye generally compensates for the variation. However, this variation can cause the light signals from light elements of one region of the barcode and dark elements of another region to be overlap in magnitude. This makes determination of light and dark elements by comparison with a threshold signal level during a scan inaccurate.

The CCD camera is coupled through a cable 32 to control electronics 52 that can be adjusted by the computer according to instructions stored in memory and/or by dedicated memory, such as ROM in association with local processor, such as an application-specific integrated circuit. The control electronics can be integrated with the computer system, or coupled to the computer with a cable 54, as shown. The amplitude of the signal from detectors or detector blocks can be monitored to automatically adjust the gain in the control electronics to insure that the signals from a light barcode element are within a preselected range as the barcode is scanned. After the gain is adjusted to achieve a desired exposure range, the software can compensate for lighter or darker regions of the image arising from variations in the brightness or reflectance of a display.

In the case of a reflective display, the reflectance and/or contrast can also vary across the screen, which can be compensated with software, as above for emissive displays, and/or the brightness of the illumination lamp can be adjusted. Thus, the reflected light will produce an output in a desired range. The illumination can also be adjusted according to the detected contrast between light and dark code elements, with or without associated gain control.

Preferably, the gain of the CCD and the light level should be adjusted so that the brightest portion of the image does not saturate the detector. For example, if the detector has 8 bits of resolution, the detected brightness should be in the 0–255 range or a slightly smaller range. The image should not be too dim (e.g. all data in the 0–8 range) or low contrast (e.g. all data in the 5–16 range) or too bright (e.g. where many pixels would read at 255).

There are quite a few methods for adjusting the brightness, including adjusting the gain of the detector, the exposure time, the brightness of the illumination source (when scanning reflective displays) and the camera lens aperture, if such control is available. Contrast adjustment and compensation for brightness variations across an image can be adjusted using computer software methods. For example, each pixel could be compared to the average of all pixels out to some fixed distance from the pixel to determine if it is brighter or darker than the local average to determine if it is part of a dark or light barcode element. Barcodes are typically designed so that there are never large contiguous regions of all light or all dark pixels. Without threshold brightness adjustment across the scanned image, a barcode rendered on a non-uniform screen might have one end portion that is all light or all dark.

Another feature of the scanning system is that it can adapt to non-square display pixels. The scanning system includes software that adjusts the resolution and scale of the scanned data to accommodate rectangular pixels. For example, although various two-dimensional barcode standards require square elements (within a specified tolerance), the reader software of the scanning system can accommodate non-square elements. The lack of squareness might arise from non-square pixels on the display, and/or image distortion, that might arise from a slightly curved screen or the scanner being held off-angle (not perpendicular) to the barcode image. Initially, the software steps would recognize and locate a barcode image. Then, the software would locate portions of the image that might represent barcode elements, and then measure the size of those portions. For example, DATAMATRIX™ barcodes have a particular border pattern. These measurements are then used to identify the individual element locations of the barcode within the image, correcting for any distortions. It is possible that the maximum allowable distortion tolerance specification may be broadened compared to corresponding printed (paper) barcodes.

5. Scanning of Color Pixels

Figure 2A:
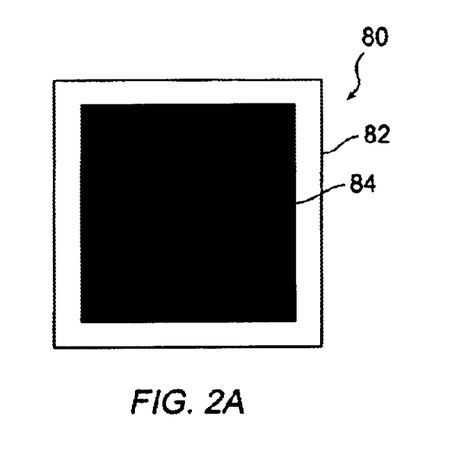
FIG. 2A is a simplified representation of a black and white pixel.

In a further embodiment, the scanning system further corrects for differences between black and white displays and color displays. Referring to FIG. 2A, in black and white displays a pixel 80 typically consists of a square active region 82 surrounded by a border 84. For typical LCDs and CRTs the active region exceeds 50% of the pixel area, and can be as high as 90% in some displays. However, in color LCD screens pixels are divided vertically into three colored subpixels that combined make up about 30–60% of the pixel area. The subpixels emit or reflect red, green, and blue light, which are mixed to display other colors.

In CRTs the red, green, and blue regions may be small dots or stripes of colored phosphor. There may be more than one dot of each color in each complete subpixel. When the colored elements of the subpixel are imaged with the monochrome CCD camera in the scanner, the colors will appear as different shades of gray. Black and white (monochrome) cameras are often designed to mimic the color response of the human eye. These cameras are called photopic cameras. Imaged with a photopic camera, the green components of a white color subpixel will appear brighter than the red and blue components. Some cameras are more sensitive to near-infrared light and will image the red portion as brightest.

Figure 2B:
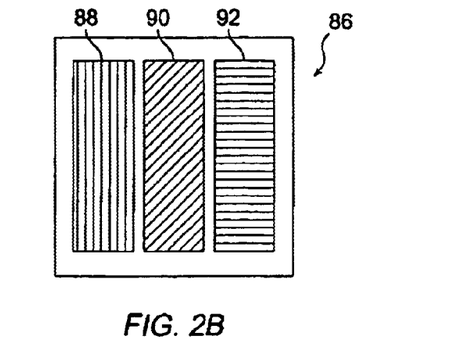
FIG. 2B is a simplified representation of a color pixel.
Figure 2C:
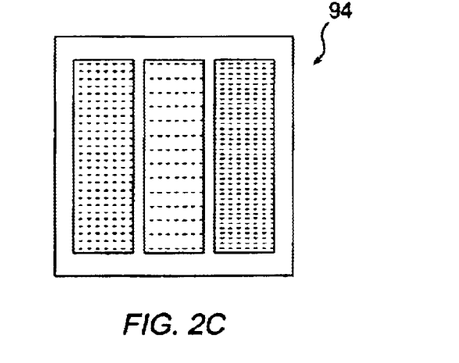
FIG. 2C is a simplified representation of an image of the color pixel of FIG. 2B with a photopic camera.

FIG. 2B illustrates the internal structure of a white-colored pixel 86 on a backlit color screen. The pixel includes a red stripe 88, a green stripe 90, and a blue stripe 92. FIG. 2C illustrates an image 94 of the white-colored pixel shown in FIG. 2B as imaged with a photopic black and white camera. All subpixel images are shades of gray, the imaged green subpixel 90' being the brightest, and the imaged blue subpixel 92' being the darkest. The imaged color pixel generally has reduced brightness, thus reducing contrast between the light and dark code elements. In a preferred embodiment, the CCD camera is not a photopic camera, but has spectral range similar to the human eye with more constant sensitivity throughout the spectral range. Alternatively, an optical filter that preferentially transmits red and blue light compared to green light can be used to balance the effective spectral response of a photopic camera when used with the filter.

Moiré patterns are another problem that can arise if the camera (detector) and display pixel active regions do not make up the entire image sensor area and display, respectively. Moiré patterns, which are large periodic variations in brightness, can be generated in the image due to interference between the two (display and sensor) pixel arrays. There are several methods by which this interference can be minimized. First, the camera pixels should cover as great a fraction of the image area as possible. This makes the output of the camera pixel an average measurement of the greatest possible area of the display area. Second, if size allows, the barcode elements should be made up of two or more of the display pixels. This puts the pixel substructure on a different spatial scale from the barcode structure, as discussed above in paragraph 41. Third, the spectral response of the camera should be chosen so that it images red, green, and blue subpixels with roughly equal sensitivity so that the colored subpixels are uniformly imaged. Finally, the barcode reader software may include adaptive low-pass filtering that removes spatial features from the image that are smaller than the size of the barcode elements. Many examples of this software are known in the art, such as Gaussian blurr filtering and two-dimensional Fourier transform filtering. Some implementations of such software can be adaptive, adjusting its filtering parameters to maximize the removal of the interference pattern.

In addition to the spatial interference between the pixel structure of the display and the camera, there may be temporal interference. Display screens are typically refreshed, or the image is re-displayed, at between 25–100 Hz. As a result, some screens, notably CRTs, flicker at the refresh rate. LCDs also flicker somewhat, but the relatively slow response (persistence) of the liquid crystals filters out most of the variation in brightness arising from the refresh cycle. Likewise, the cameras periodically sample and output an image. The sampling rate and refresh rate can interfere to cause severe brightness variations in the barcode image.

There are at least two methods to prevent this effect. One is to reduce the sample rate of the camera so that it will always include at least several complete refresh cycles. Ideally, the camera should capture 2 or more, preferably 10 or more, and more preferably 10–20 refresh cycles in each imaging cycle. For example, if the refresh rate is 25 Hz, the exposure time would be at least about 0.08 seconds, preferably 0.4–0.8 seconds, and Using this technique, the brightness modulation of the display refresh rate is averaged out. Unfortunately, this means capturing images at a slow rate. The image can smear if the user does not hold the scanner and displayed code steady; however, the refresh rate on many non-interlaced computer displays is at least 60 Hz, thus an exposure time of about 0.17–0.33 seconds would be appropriate for use with these systems.

An alternative approach is to synchronize the imaging camera to the display refresh rate. The refresh rate can be detected with a photodiode and used to synchronize a phase-locked-loop ("PLL") frequency generator inside the scanner. A photodiode in the scanner can detect the refresh rate by providing a signal corresponding to the least amount of detected light, which occurs during the vertical blanking interval for a CRT. The period of this signal is the refresh period. The scanner exposure time per image can then be set to be an integer multiple of the refresh period. With the refresh and exposure time periods locked there will be no temporal interference between the camera and the display. The camera shutter could be synchronized to open and close during this period with an integer number of vertical blanking intervals in between. This provides an accurate scan from a single exposure once the frequencies are locked.

4. Exemplary Processes

Figure 3A:
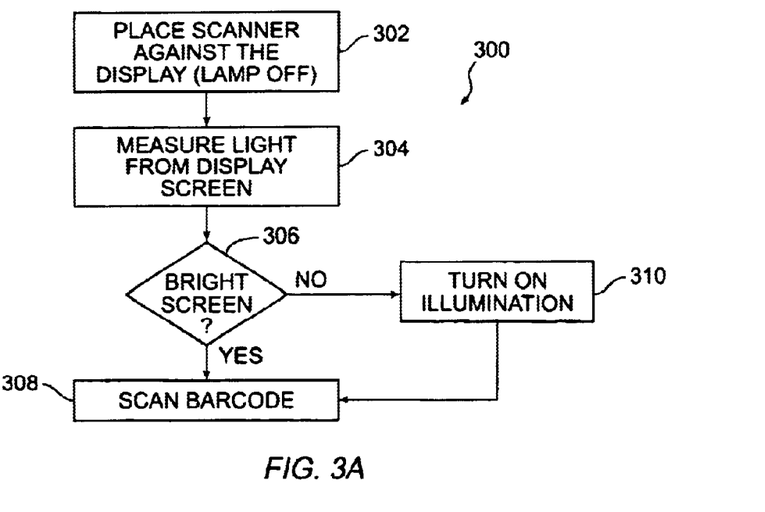
FIG. 3A is a simplified flow chart of a process for detecting the type of display screen and setting a barcode scanner according to an embodiment of the present invention.

FIG. 3A is a simplified flow chart of a process for detecting a type of display screen and setting the illumination of a barcode scanner 300 according to an embodiment of the present invention. The process is typically implemented according to a computer program (see, e.g. FIG. 1C, ref. num. 48) having a number of computer-executable instructions stored in a computer-readable memory or medium. The computer-readable medium might be integrated into a scanning system, or might be separate from the system, such as a diskette or CD-ROM, for loading ("reading") into the system, or might be stored in a remote medium, such as a server, and downloaded to the scanning system. The scanning system can thus be configured according to the computer program to perform the process.

A scanner with an imaging camera is placed against the display (step 302) and the light output from the display screen is measured (step 304). The scanner includes an illumination lamp that is initially off, and preferably includes a shroud to exclude ambient light from entering the camera and causing an error in reading the light level. The light can be measured with a photodiode (peak brightness over a period at least as long as the slowest refresh rate), or by imaging the screen with the camera, for example. The light output is then evaluated to determine if the screen is bright or dark by comparing the measured light to a programmed threshold value (step 306). If the measured light exceeds the threshold value, the display is presumed to be emissive and the scanner scans the displayed barcode (step 308) without turning on the illumination lamp. Leaving the illumination lamp off improves the first scan rate (FSR) by improving the contrast, or more specifically, not degrading the contrast, of the displayed barcode. If the display is not emissive, the illumination lamp is turned on (step 310) before scanning the displayed barcode (step 308).

Figure 3B:
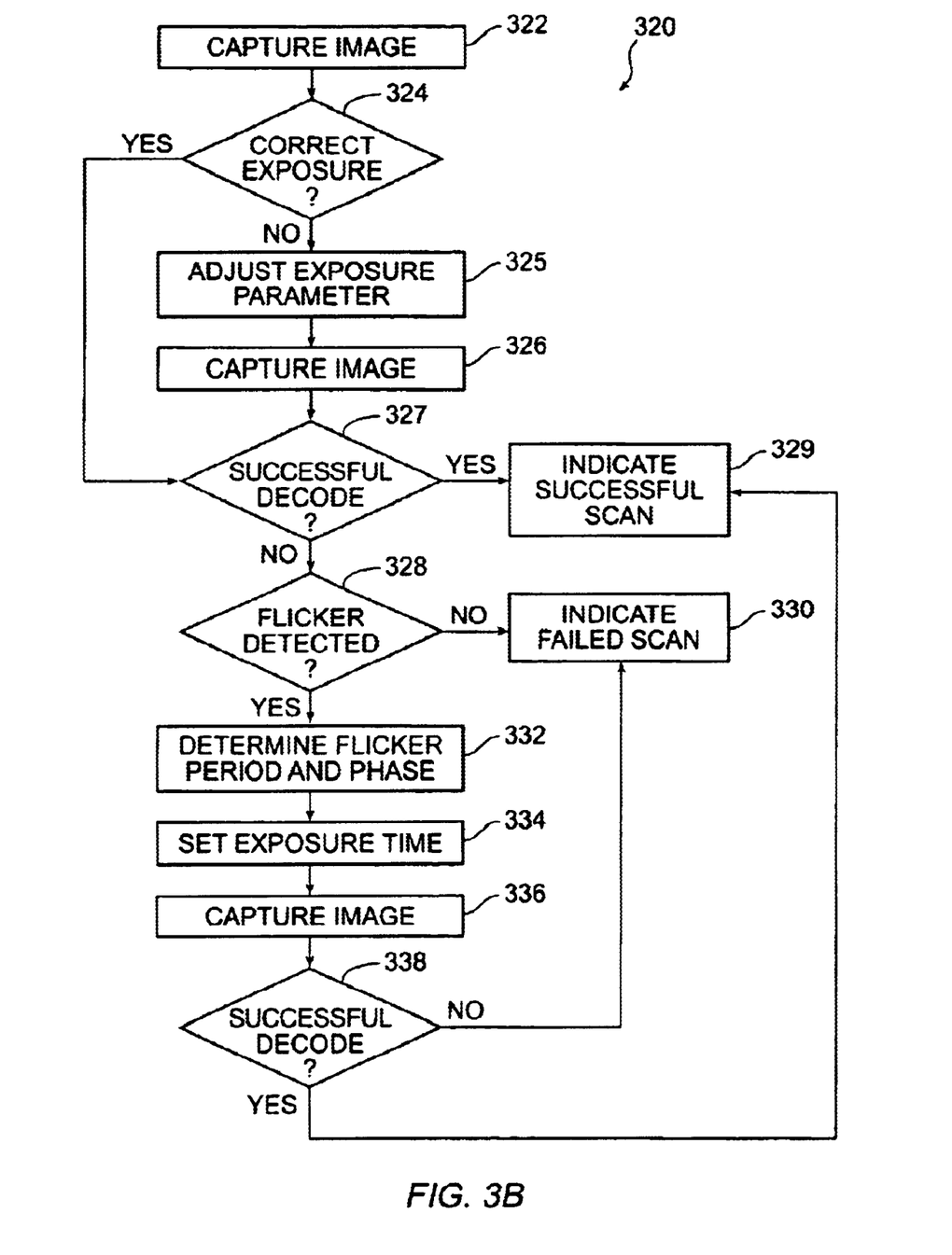
FIG. 3B is a simplified flow chart of a process for setting exposure time according to display refresh rate according to an embodiment of the present invention.

FIG. 3B is a simplified flow chart of a process for setting the exposure time of a barcode scanner according to the refresh rate of an emissive display screen 320 according to another embodiment of the present invention. The process is typically implemented according to a computer program (see, e.g. FIG. 1C, ref. num. 48) having a number of computer-executable instructions stored in a computer-readable memory or medium. The computer-readable medium might be integrated into a scanning system, or might be separate from the system, such as a diskette or CD-ROM, for loading ("reading") into the system, or might be stored in a remote medium, such as a server, and downloaded to the scanning system. The scanning system can thus be configured according to the computer program to perform the process.

A preliminary image is captured by the camera (step 322) and automatically evaluated by the computer according to instructions stored in software to determine if the image data represents over or under exposure (step 324). If the exposure is incorrect, the camera gain or the exposure time is adjusted (step 325) and another image is captured (step 326). If the exposure appears correct, decoding of the barcode image is attempted (step 327). If the barcode image can not be decoded, the display screen is tested for screen flicker by measuring the brightness with the photodiode for a sufficient period of time to measure the refresh rate of the display (step 328), typically for about 50–200 ms. If the barcode image is successfully decoded, an indication of a successful reading is provided (step 329).

If the screen is not flickering above a programmed threshold (i.e. the minimum detected level is not sufficiently different from the maximum detected level), a barcode read failure is indicated (step 330). If flickering is detected, the flicker frequency and phase is determined (step 332) from the data measured in step 328. An exposure time that is an integer multiple of the flicker period is set (step 334), and an image is captured using the exposure time and phase determined in step 332 (step 336). An attempt to decode this barcode image is made (step 338), and indication is made if the decoding was successful (step 329). Indications of successful and unsuccessful readings can be different audible tones, different lights on the scanner viewed by the operator, or messages written to a display of the scanner system, for example.

Figure 3C:
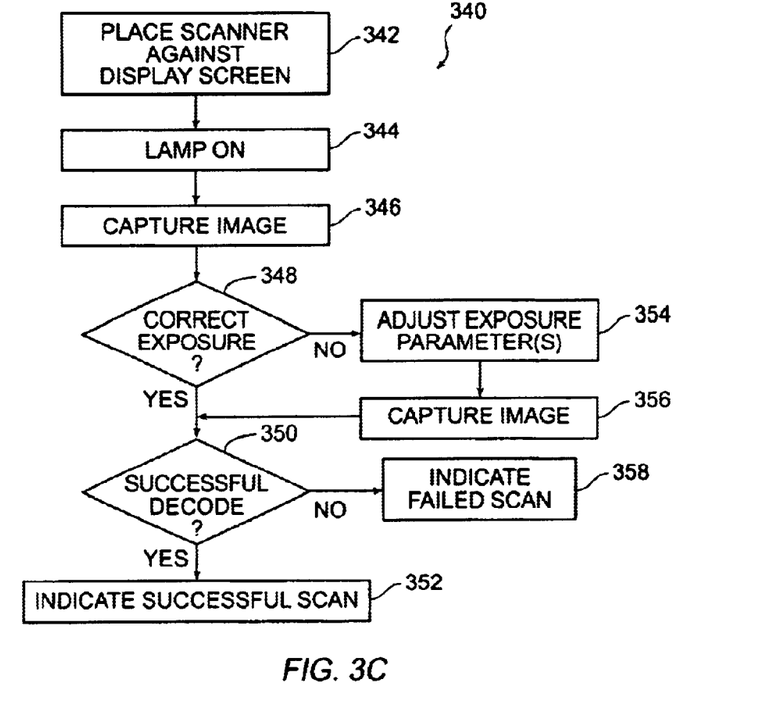
FIG. 3C is a simplified flow chart of a process for optimizing image contrast according to an embodiment of the present invention.

FIG. 3C is a simplified flow chart of a process for optimizing image contrast of a reflective display screen 340 according to yet another embodiment of the present invention. The process is typically implemented according to a computer program (see, e.g. FIG. 1C, ref. num. 48) having a number of computer-executable instructions stored in a computer-readable memory or medium. The computer-readable medium might be integrated into a scanning system, or might be separate from the system, such as a diskette or CD-ROM, for loading ("reading") into the system, or might be stored in a remote medium, such as a server, and downloaded to the scanning system. The scanning system can thus be configured according to the computer program to perform the process.

A scanner with an imaging camera is placed against a display screen showing a barcode (step 342). The illumination lamp is already on, or is turned on (step 344), and an image of the displayed barcode is captured with the camera (step 346). The image data is evaluated for over or under exposure (step 348), and if the exposure is correct, an attempt is made to decode the barcode image (step 350). If the barcode image is successfully decoded, a signal indicating a successful barcode reading is provided (step 352).

If the image is not correctly exposed, the exposure time, illumination lamp brightness, aperture, and/or camera gain is adjusted (step 354) according to the data evaluated in step 348. Once the exposure parameter(s) has been adjusted, another image is captured (step 356), and an attempt is made to decode this image (step 350). If decoding is successful, the signal indicating a successful decode is provided (step 352), if not, a signal indicating an unsuccessful scan is provided (358). Additional loops may be added to the process to attempt to correct exposure a selected number of times before indicating a scan failure.

Figure 3D:
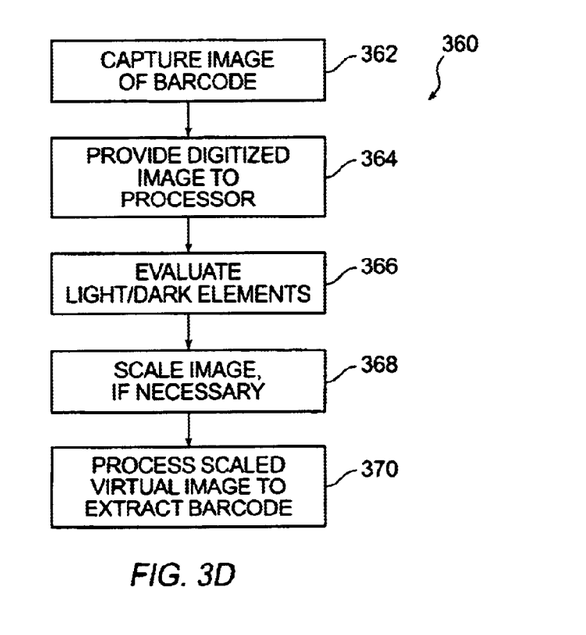
FIG. 3D is a simplified flow chart of a process for scaling non-square scanned barcode elements according to an embodiment of the present invention.

FIG. 3D is a simplified flow chart of a process for scaling non-square scanned barcode elements 360 according to another embodiment of the present invention. The process is typically implemented according to a computer program (see, e.g. FIG. 1C, ref. num. 48) having a number of computer-executable instructions stored in a computer-readable memory or medium. The computer-readable medium might be integrated into a scanning system, or might be separate from the system, such as a diskette or CD-ROM, for loading ("reading") into the system, or might be stored in a remote medium, such as a server, and downloaded to the scanning system. The scanning system can thus be configured according to the computer program to perform the process.

An imaging scanner captures an image of a barcode displayed on an electronic screen (step 362). Typically, the detectors in the camera array output an analog signal proportional to the intensity of the light illuminating that detector. This analog output is typically amplified, with the gain being adjusted for intensity and contrast, and digitized on the camera chip. Hence, the output of the imaging camera is typically in digital form.

The image is provided to a digital processor (step 364) that evaluates light and dark regions of the image (step 366) according to instructions from a computer-readable program to determine if the light and dark regions corresponding to two-dimensional barcode elements are square by comparing the lengths of adjoining sides of the regions. If the regions are not square, the processor scales the image, either by lengthening one axis or/and shortening the other to translate the image into a scaled virtual image of square elements according to the measured ratio of the sides (step 368). The scaled virtual image is then electronically processed ("scanned") to read the barcode represented by the scaled virtual image (step 370).

Figure 3E:
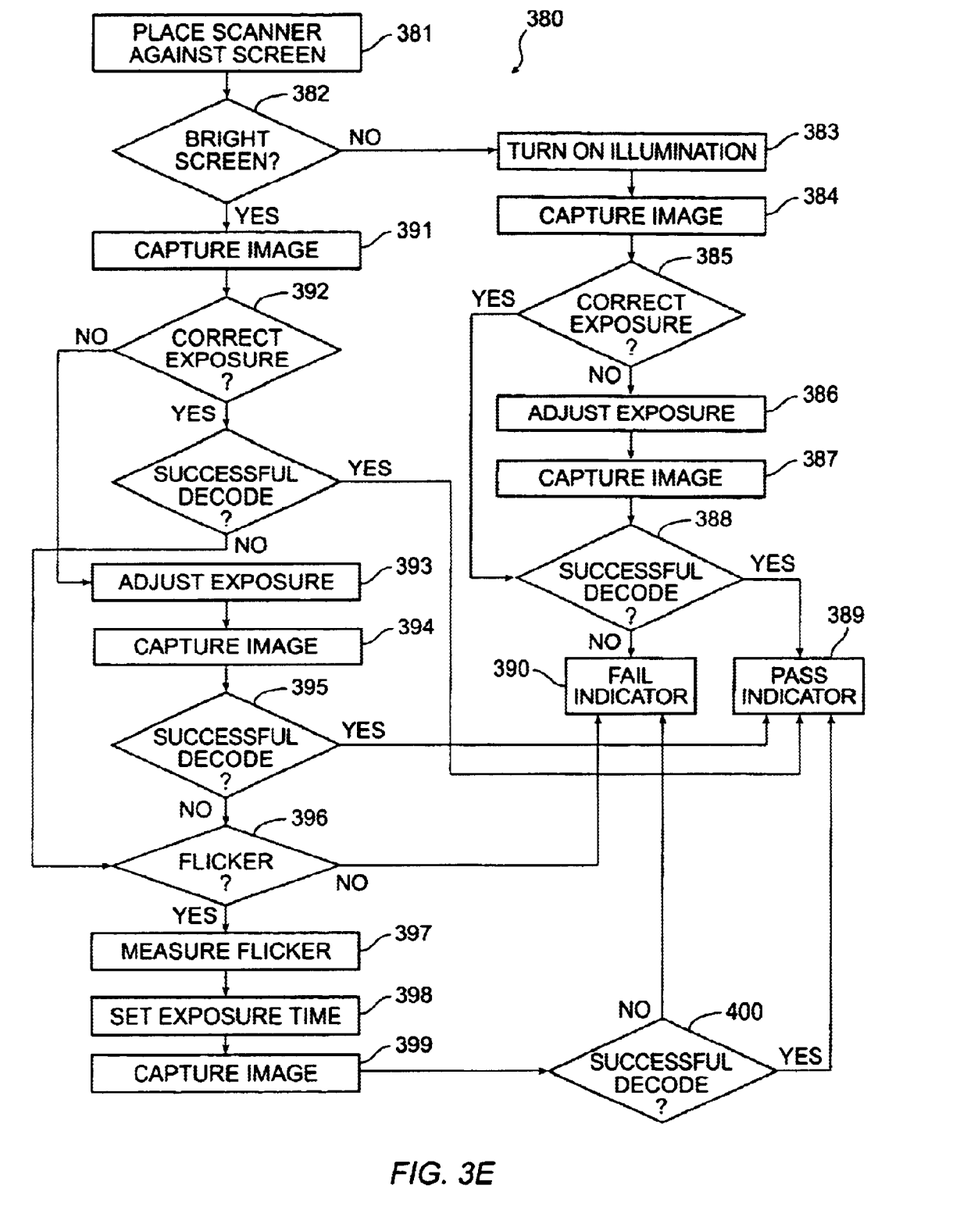
FIG. 3E is a simplified flow chart of a process for operating a barcode scanning system according to an embodiment of the present invention.

FIG. 3E is a simplified flow chart of a process for operating a barcode scanning system 380 to scan barcodes rendered on an electronic display screen according to an embodiment of the present invention. The process is typically implemented according to a computer program (see, e.g. FIG. 1C, ref. num. 48) having a number of computer-executable instructions stored in a computer-readable memory or medium. The computer-readable medium might be integrated into a scanning system, or might be separate from the system, such as a diskette or CD-ROM, for loading ("reading") into the system, or might be stored in a remote medium, such as a server, and downloaded to the scanning system. The scanning system can thus be configured according to the computer program to perform the process.

The scanner is placed against an electronic screen displaying a barcode (step 381) and the screen type is evaluated (step 382) with a photodiode to determine if the screen is emissive or reflective. If the screen is reflective, the illumination lamp is turned on (step 383) and an image of the barcode is captured (step 384). In a particular embodiment, the operator views the camera image on a scanning system display and to insure that the barcode is within the image region, and triggers the image capturing step by actuating an electronic switch, such as a trigger switch.

The captured image is evaluated for correct exposure (step 385), and exposure parameters are adjusted (step 386) if necessary, after which a second image is captured (step 387). An attempt to decode the second image is made (step 388), and an indication is given as to whether the scan is successful (step 389) or unsuccessful (step 390). Similarly, if the initial exposure was correct, an attempt to decode the first image is made (step 388), with similar indication of a successful or unsuccessful scan.

If the screen is detected as being emissive, the illumination lamp remains off and an image is captured (step 391). This image is then evaluated for correct exposure (step 392) and image parameters are adjusted (step 393) if necessary, and a second image is captured (step 394). An attempt to decode the second image is made (step 395), and if the scan is successful, a successful scan indication is generated (step 389). If the scan is unsuccessful, the display screen is evaluated for flicker (step 396). If no flicker is detected, a failed scan indicator is generated (step 390). Similarly, if the first image is within acceptable exposure limits, an attempt is made to decode the first image, and if successful, a successful scan indication is generated, and if the decode is unsuccessful, the process flow proceeds to check for flicker If flicker is detected, the phase and period of the flicker is determined (step 397), and the exposure time is adjusted according to the measured display flicker rate (step 398). Another image is captured (step 399) and an attempt is made to decode this image (step 400). If the decode is successful a successful scan indicator is generated (step 389), and if not, a failed scan indicator is generated (step 390).

Thus, it is possible to scan barcodes, including two-dimensional barcodes, from a variety of electronic displays. The screen type is determined, and appropriate scanning conditions established. If the screen is emissive, the flicker is measured and used to set the exposure time of the imager. The scanner adapts to non-square barcode elements on a display with rectangular pixels by measuring known barcode elements and scaling the image data to produce barcode elements within the aspect ratio tolerance. The scanner also reliably scans images from color displays by incorporating features in the components, such as a photopic camera, and in the software, such as digital filtering to remove interference patterns.

While the present invention has been described in terms of the specific embodiments discussed in detail above, alternatives and equivalents may be apparent or become apparent to those skilled in the art without departing from the invention. For example, although Morié patterns have been used to describe interference, other types of interference might arise. Accordingly, the invention is to be interpreted according to the following claims.

What is claimed is:

1. A scanner for reading computer-readable codes, the scanner comprising:
    an imaging camera configured to produce an image of a computer-readable code from a surface;
    a shroud at least partially surrounding the imaging camera and configured to exclude ambient light from entering the imaging camera when the scanner is held against the surface; and
    an illumination lamp disposed within the shroud to illuminate the computer-readable code at an angle chosen in a manner to avoid specular reflection of light from the illumination lamp off the surface to the imaging camera.

2. The scanner of claim 1 wherein the imaging camera has a spectral response variation of less than 25% from about 400 nm to about 700 nm.

3. The scanner of claim 1 wherein the imaging camera is disposed a distance d from the surface and has a camera imaging area with an image width of 2s, the camera imaging area having a first edge and an opposite edge, wherein the illumination lamp is disposed beyond, relative to the imaging camera, a limit line extending from the first edge or the opposite edge at a limit line angle from normal to the surface, the limit line angle being greater than the inverse tangent of s/2d.

4. The scanner of claim 3 wherein the limit line angle is greater than 13 degrees.

5. The scanner of claim 1 further comprising an optical filter disposed between the imaging camera and the surface, the optical filter transmitting relatively more blue and red light to the imaging camera.

6. A scanner for reading computer-readable codes, the scanner comprising:
    a photopic imaging camera configured to produce an image of a computer-readable code from a surface;
    a shroud at least partially surrounding the photopic imaging camera and configured to exclude ambient light from entering the photopic imaging camera when the scanner is held against the surface; and
    an illumination lamp disposed within the shroud to illuminate the computer-readable code at an angle chosen in a manner such that light from the illumination lamp is not directly reflected from the surface to the photopic imaging camera.

7. The scanner of claim 6 further comprising an optical filter disposed between the imaging camera and the surface, the optical filter transmitting relatively more blue and red light than green light to the imaging camera.

8. The scanner of claim 6 wherein the photopic imaging camera has a spectral response variation of less than 25% from about 400 nm to about 700 nm.

9. A scanner for reading computer-readable codes, the scanner comprising:
    an imaging camera configured to produce an image of a computer-readable code from a surface;
    a shroud at least partially surrounding the imaging camera and configured to exclude ambient light from entering the imaging camera when the scanner is held against the surface and configured to place the scanner at a selected oblique angle relative to the surface when the scanner is held against the surface; and
    an illumination lamp disposed within the shroud to illuminate the computer-readable code at an angle chosen in a manner such that light from the illumination lamp is not directly reflected from the surface to the imaging camera.

10. The scanner of claim 9 wherein the imaging camera has a spectral response variation of less than 25% from about 400 nm to about 700 nm.

11. The scanner of claim 9 further comprising an optical filter disposed between the imaging camera and the surface, the optical filter transmitting relatively more blue and red light than green light to the imaging camera.

12. A scanner for reading computer-readable codes, the scanner comprising:
    an imaging camera configured to produce an image of a computer-readable code from a surface;
    a photodiode,
    a shroud at least partially surrounding the imaging camera and configured to exclude ambient light from entering the imaging camera when the scanner is held against the surface; and
    an illumination lamp disposed within the shroud to illuminate the computer-readable code at an angle chosen in a manner such that light from the illumination lamp is not directly reflected from the surface to the imaging camera.

13. The scanner of claim 12 wherein the imaging camera has a spectral response variation of less than 25% from about 400 nm to about 700 nm.

14. The scanner of claim 12 further comprising an optical filter disposed between the imaging camera and the surface, the optical filter transmitting relatively more blue and red light than green light to the imaging camera.

15. A scanner for reading computer-readable codes, the scanner comprising:
    an imaging camera configured to produce an image of a computer-readable code from a surface;
    a shroud at least partially surrounding the imaging camera and configured to exclude ambient light from entering the imaging camera when the scanner is held against the surface and to hold the imaging camera in a selected relation to the surface;
    a photodiode disposed within the shroud; and
    an illumination lamp disposed within the shroud beyond, relative to the imaging camera, a limit line extending from an edge of an imaging region at an angle of inverse tangent s/2d wherein s is one-half the width of the imaging region and d is the distance of the camera from the surface to avoid specular reflection of light from the illumination lamp off the surface to the imaging camera.

16. A method of scanning an image of computer-readable code from an electronic display, the method comprising:
    providing a scanner with a shroud, an illumination lamp in the off condition and a photodetector;
    coupling the shroud to a surface of the electronic display to exclude ambient light from the computer-readable code;

measuring light from the electronic display with the photodetector to determine whether the electronic display is an emissive display, and, if the electronic display is not an emissive display;

turning on the illumination lamp; and scanning the image of the computer-readable code from the electronic display.

17. The method of claim 16 wherein the photodetector is a photodiode.

18. The method of claim 16 wherein the photodetector is an imaging camera.

19. The method of claim 16 further comprising steps, after the scanning step, of:

evaluating an exposure level of the image of computer-readable code, and, if the exposure level is outside preselected limits;

adjusting an exposure parameter of the scanner; and scanning the image of the computer-readable code from the electronic display.

20. A computer-readable medium having computer-executable instructions for performing a method comprising:

measuring light from an electronic display with an imaging camera, and, if the measured light is below a selected threshold;

turning on an illumination lamp; and scanning a computer-readable code from the electronic display with the imaging camera.

21. A method of scanning a barcode from an electronic display with an imaging scanner, the method comprising:

measuring a refresh period of the electronic display;

setting an exposure time of the imaging scanner according to the measured refresh period.

22. The method of claim 21 wherein the exposure time is at least twice the refresh period of the electronic display.

23. The method of claim 21 wherein the exposure time is at least ten times the refresh period of the electronic display.

24. The method of claim 21, wherein the exposure time is between 10–20 times the refresh period of the electronic display.

25. The method of claim 21 further comprising steps of capturing an image from the electronic display with the imaging scanner;

evaluating the image for an exposure level; and adjusting an exposure parameter of the imaging scanner according to the exposure level.

26. A method of scanning a barcode from an electronic display with an imaging scanner, the method comprising:

capturing a first image of the barcode;

evaluating the first image for an exposure level;

adjusting an exposure parameter of the imaging scanner according to the exposure level;

capturing a second image of the barcode;

attempting to decode the second image to obtain barcode information, and if the attempting step fails;

measuring a refresh period of the electronic display;

setting an exposure time of the imaging scanner according to the measured refresh period;

capturing a third image of the barcode; and decoding the third image to obtain barcode information.

27. A computer-readable medium having computer-executable instructions for performing a method of:

measuring a refresh period of an emissive electronic display;

setting an exposure time of an imaging scanner according to the measured refresh period; and imaging a barcode displayed on the emissive electronic display.

28. A method of scanning an image of a barcode with non-square pixels displayed on an electronic display, the method comprising:

capturing the image of the barcode displayed on the electronic display;

digitizing the image to create a digitized image;

providing the digitized image to a processor;

determining an aspect ratio of a barcode element, and, if the aspect ratio is outside of preselected limits;

scaling the digitized image to create a scaled virtual image with scaled barcode elements having aspect ratios within the preselected limits; and decoding the scaled virtual image to obtain barcode information.

29. A method of scanning an image of a barcode displayed on an electronic display, the method comprising:

capturing the image of the barcode displayed on the electronic display;

digitizing the image to create a digitized image;

providing the digitized image to a processor;

digitally filtering interference patterns from the digitized image to create a filtered image; and decoding the filtered image to obtain barcode information.

30. The method of claim 29 wherein the electronic display is a color display.

31. A method of scanning an image of a barcode displayed on an electronic display, the method comprising:

evaluating the electronic display to determine if the electronic display is an emissive display;

capturing a first image of the barcode with an imaging scanner;

evaluating an exposure level to determine if the exposure level is within preselected exposure level limits, and, if the exposure level is not within the preselected exposure level limits;

adjusting an exposure parameter of the imaging scanner;

capturing a second image of the barcode with the imaging scanner; and decoding the second image of the barcode to obtain barcode information.

32. A method of scanning an image of a barcode displayed on an electronic display, the method comprising:

evaluating the electronic display to determine if the electronic display is an emissive display;

capturing a first image of the barcode with an imaging scanner;

evaluating an exposure level to determine if the exposure level is within preselected exposure level limits, and, if the exposure level is not within the preselected exposure level limits;

adjusting an exposure parameter of the imaging scanner;

capturing a second image of the barcode with the imaging scanner;

attempting to decode the second image to obtain barcode information, and, if the attempt to decode fails;

measuring the electronic display for flickering;

determining a refresh period;

setting an exposure time according to the refresh period;

capturing a third image of the barcode with the imaging scanner; and decoding the third image to obtain barcode information.

* * * * *